United States Patent
Murakami et al.

(10) Patent No.: US 11,888,526 B2
(45) Date of Patent: Jan. 30, 2024

(54) OPTICAL TRANSMITTER, COMMUNICATION APPARATUS, AND METHOD OF CONTROLLING BIAS VOLTAGE OF ELECTRO-OPTIC MODULATOR

(71) Applicant: FUJITSU LIMITED, Kawasaki (JP)

(72) Inventors: Shoichi Murakami, Kawasaki (JP); Kosuke Komaki, Kawasaki (JP); Hidetoshi Sato, Kawasaki (JP); Yuya Osumi, Kawasaki (JP); Yusuke Shigeta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/849,278

(22) Filed: Jun. 24, 2022

(65) Prior Publication Data

US 2023/0080354 A1 Mar. 16, 2023

(30) Foreign Application Priority Data

Sep. 15, 2021 (JP) .................................. 2021-149875

(51) Int. Cl.
  *H04B 10/50* (2013.01)
  *G02F 1/21* (2006.01)
  *G02F 1/01* (2006.01)

(52) U.S. Cl.
  CPC ..... *H04B 10/50575* (2013.01); *G02F 1/0123* (2013.01); *G02F 1/212* (2021.01)

(58) Field of Classification Search
  CPC .. H04B 10/50575; G02F 1/212; G02F 1/0123
  USPC .......................................................... 398/3
  See application file for complete search history.

(56) References Cited

U.S. PATENT DOCUMENTS

| 11,159,242 | B2 * | 10/2021 | Kawakami | H04B 10/54 |
| 2003/0107791 | A1 * | 6/2003 | Seung Il | G02F 1/0123 359/245 |
| 2007/0269223 | A1 | 11/2007 | Noguchi et al. | |
| 2013/0135704 | A1 | 5/2013 | Fujisaku | |

(Continued)

FOREIGN PATENT DOCUMENTS

| EP | 2148457 A2 * | 1/2010 | ......... H04B 10/5057 |
| JP | 2007-310288 A | 11/2007 | |
| JP | 2012-211936 A | 11/2012 | |

OTHER PUBLICATIONS

Cho et al; Bias Control for Optical OFDM Transmitters; Jul. 2010; IEEE; pp. 1-3. (Year: 2010).*

*Primary Examiner* — Amritbir K Sandhu
(74) *Attorney, Agent, or Firm* — STAAS & HALSEY LLP

(57) ABSTRACT

An optical transmitter includes an electro-optic modulator, a monitor circuit that monitors output light of the electro-optic modulator, and a processor that controls a bias voltage of the electro-optic modulator using a monitoring result of the monitor circuit, wherein the processor superimposes a first dither signal with a first frequency and a second dither signal with a second frequency different from the first frequency, onto one bias voltage in a time sharing manner, calculates a first control error based on a first component oscillating at the first frequency and a second control error based on a second component oscillating at the second frequency based on the monitoring result, and determines a control value for controlling the bias voltage using the first control error and the second control error.

14 Claims, 16 Drawing Sheets

(56) References Cited

U.S. PATENT DOCUMENTS

| | | | |
|---|---|---|---|
| 2014/0168741 A1* | 6/2014 | Li | G02F 1/0123 |
| | | | 359/239 |
| 2018/0088359 A1* | 3/2018 | Shirakawa | G02F 1/2257 |
| 2018/0267340 A1* | 9/2018 | Rohde | G02F 1/225 |
| 2020/0081313 A1* | 3/2020 | Padmaraju | G02F 1/0123 |
| 2023/0080354 A1* | 3/2023 | Murakami | H04B 10/50575 |
| | | | 398/198 |

* cited by examiner

FIG.7

| DITHER FREQUENCY | ARM | MEMORY ADDRESS | CONTROL ERROR | VARIANCE ($\sigma^2$) |
|---|---|---|---|---|
| f1 | Φ | 1 | A_Φ_1 | $\sigma^2\_A\Phi$ |
| | | 2 | A_Φ_2 | |
| | | ⋮ | ⋮ | |
| | | N | A_Φ_N | |
| | I | 1 | A_I_1 | $\sigma^2\_AI$ |
| | | 2 | A_I_2 | |
| | | ⋮ | ⋮ | |
| | | N | A_I_N | |
| | Q | 1 | A_Q_1 | $\sigma^2\_AQ$ |
| | | 2 | A_Q_2 | |
| | | ⋮ | ⋮ | |
| | | N | A_Q_N | |
| f2 | Φ | 1 | B_Φ_1 | $\sigma^2\_B\Phi$ |
| | | 2 | B_Φ_2 | |
| | | ⋮ | ⋮ | |
| | | N | B_Φ_N | |
| | I | 1 | B_I_1 | $\sigma^2\_BI$ |
| | | 2 | B_I_2 | |
| | | ⋮ | ⋮ | |
| | | N | B_I_N | |
| | Q | 1 | B_Q_1 | $\sigma^2\_BQ$ |
| | | 2 | B_Q_2 | |
| | | ⋮ | ⋮ | |
| | | N | B_Q_N | |

164a: f1 group
164b: f2 group
164: table

FIG.11

| No. | METHOD | PROCESS OUTLINE | EFFECT | ADVANTAGE |
|---|---|---|---|---|
| 1 | SIMPLE AVERAGE | Save total of M control errors for f1 and f2 (M/2 f1 errors and M/2 f2 errors), and calculate moving average | Significant noise influence on either one of f1 or f2 dither can be reduced | Simple processing circuit |
| 2 | MEAN SUM OF SQUARES | Save total of M control errors for f1 and f2 (M/2 f1 errors and M/2 f2 errors), and calculate [root] mean sum of squares as the control value | Ditto | Noise reduction effect similar to increasing the window size of simple averaging can be achieved using a smaller buffer |
| 3 | NOISE CANCEL BY VARIANCE | Save total of M control errors for f1 and f2 (M/2 f1 errors and M/2 f2 errors), calculate variances ($\sigma^2$) for f1 and f2, and select smaller variance as the control value | Greater noise superimposed on f1 or f2 can be removed | Noise reduction performance is higher than the other methods because presence/absence of noise influence can be identified |

OPTICAL TRANSMITTER, COMMUNICATION APPARATUS, AND METHOD OF CONTROLLING BIAS VOLTAGE OF ELECTRO-OPTIC MODULATOR

CROSS-REFERENCE TO RELATED APPLICATIONS

This application is based upon and claims priority to earlier Japanese Patent Application No. 2021-149875 filed Sep. 15, 2021, which is incorporated herein by reference in its entirety.

FIELD

The present documents relate to an optical transmitter, a communication apparatus, and a method of controlling a bias voltage of an electro-optic modulator.

BACKGROUND

Optical coherent transceivers using Mach-Zehnder electro-optic Modulators (MZMs) to perform quadrature phase shift keying (QPSK) are employed in fiber optic communications. An MZM adapted to perform QPSK has two sub-MZMs called child MZMs which are nested to form one main MZM called a parent MZM. In order to correctly perform phase modulation, it is a prerequisite for the electro-optic modulator to keep the respective child MZMs and the parent MZM in the appropriate phase states. Each of the MZMs is controlled into the appropriate phase under an externally applied bias voltage.

It is known that the operating point of an electro-optic modulator drifts due to a change in the operating environment including the temperature and the wavelength, or changes over time. If the operating point drifts, the phase of each MZM deviates from the ideal phase and the quality of the main signal deteriorates. For these reasons, feedback control is performed even during operation, in parallel with signal modulation, to compensate for the bias drift. See, for example, Patent Document 1 presented below. A configuration, in which noise contained in an optically modulated pilot signal is extracted to remove the noise from the synchronously detected signal so as to appropriately control the operating point of the electro-optic modulator, has also been proposed. See, for example, Patent Document 2 presented below.

Patent Document 1: Japanese Patent Application Publication No. 2012-211936
Patent Document 2: JP Patent Application Publication No. 2007-310288.

Disturbance or noise can also be a factor in disturbing the optical phase of the electro-optic modulator. In a communication device including a plug-in unit equipped with a digital coherent optical transceiver, switching noise of the power supply unit and noise from the pulse width modulation (PWM) circuit for regulating the cooling fan rate will disturb the phase of the electro-optic modulator. Compared to the drift of the operating point, the phase fluctuation due to the disturbance or the noise is small, and the adverse influence on the quality of the main signal has been negligible so far. However, with the increased degree of multi-level modulation for expanding the transmission capacity, the symbol spacing becomes narrower, and influence on the main signal due to minute phase fluctuation cause by disturbance or noise becomes apparent. For instance, the effect of disturbance or noise on the quality of the main signal is sufficiently small in 16-quadrature amplitude modulation (QAM), but with 64-QAM, the effect of disturbance or noise on the main signal cannot be ignored.

SUMMARY

One aspect of the invention is to provide an optical transmitter in which the influence of disturbance or noise on phase fluctuation is reduced and the quality of the main signal is maintained.

In an embodiment, an optical transmitter includes an electro-optic modulator, a monitor circuit that monitors the output light of the electro-optic modulator, and a microprocessor that controls the bias voltage of the electro-optic modulator using the monitoring result of the monitor circuit. The microprocessor superimposes a first dither signal with a first frequency and a second dither signal with a second frequency different from the first frequency onto one bias voltage in time sharing manner. Using the monitoring result, the microprocessor calculates a first control error based on a first component oscillating at the first frequency and a second control error based on a second component osciflating at the second frequency, and determines a control value for controlling the bias voltage using the first control error and the second control error.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 7 illustrates an example of a control value lookup table;
FIG. 11 illustrates outlines and effects/advantages of the respective arithmetic processes.

EMBODIMENT(S)

Figure 1A:
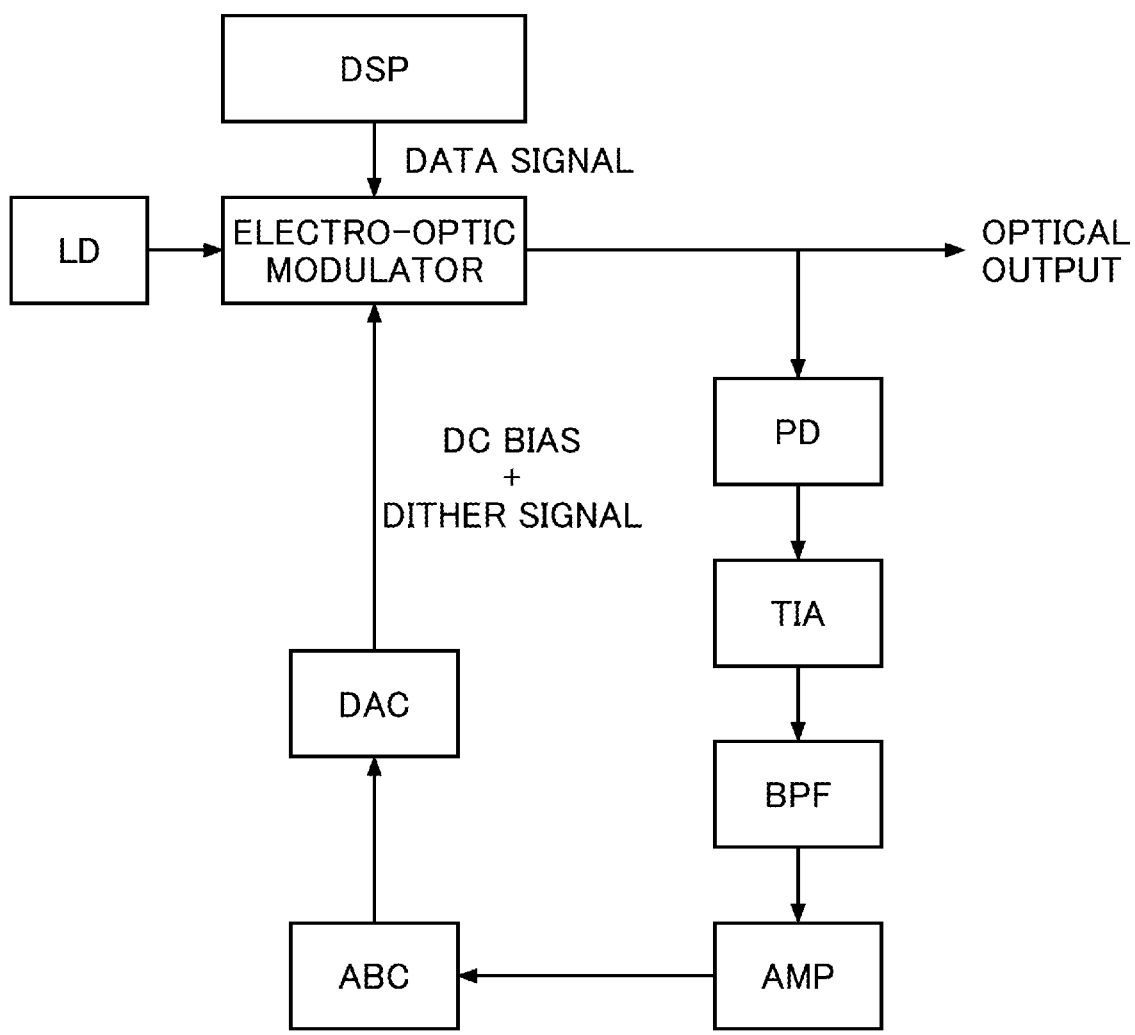
FIG. 1A illustrates a typical bias control.
Figure 1B:
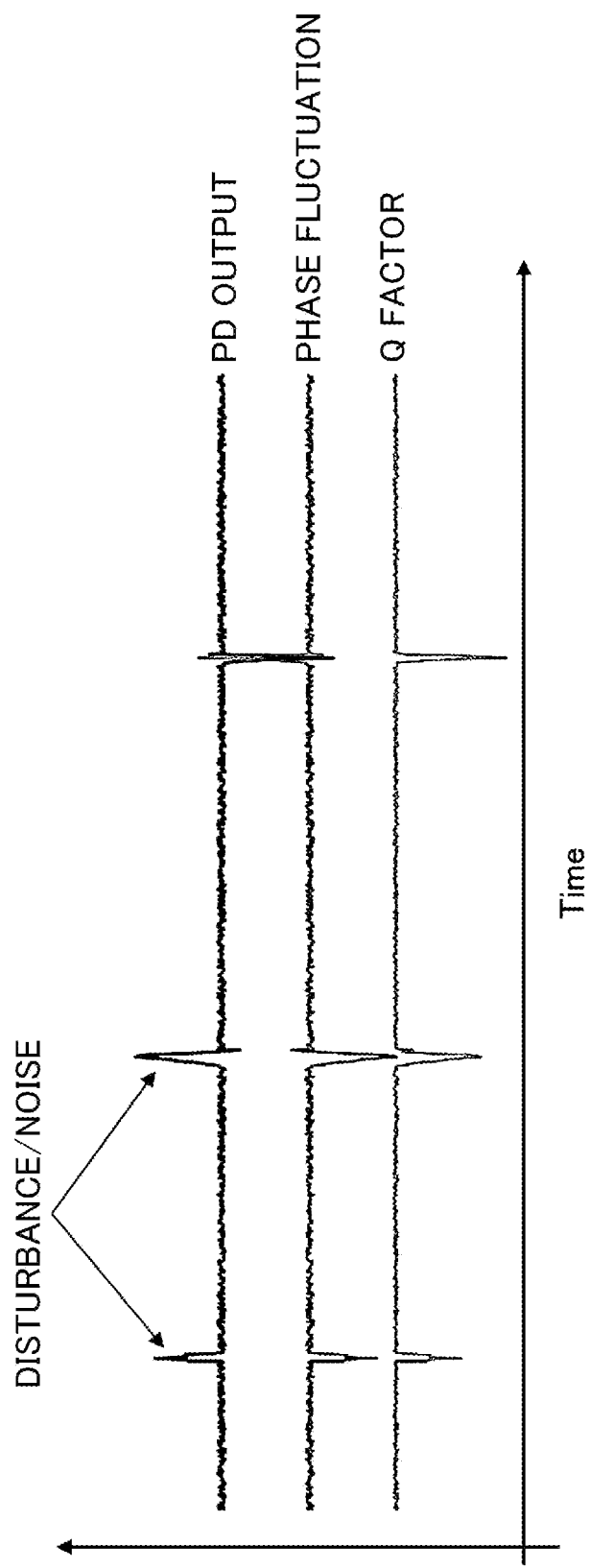
FIG. 1B illustrates influence of disturbance or noise caused in the configuration of FIG. 1A.

Prior to describing the particulars of the configuration of the optical transmitter and bias control scheme according to the embodiments, the technical issue found by the inventors, that is, the influence due to disturbance or external noise will be described with reference to FIG. 1A and FIG. 1B. FIG. 1A illustrates a typical bias control technique, and FIG. 1B illustrates influence of disturbance or noise caused in the configuration of FIG. 1A. The electro-optic modulator modulates a continuous light beam incident from a laser diode (LD) with data signals generated by a digital signal processor (DSP), and outputs a modulated optical signal. Automatic bias control (ABC) is performed to bring the respective MZMs forming the electro-optic modulator to be in the appropriate phases.

A portion of the modulated optical signal, output from the electro-optic modulator, is split and monitored by a photodetector (PD). Bias control value is calculated by the ABC circuit based on the monitoring result so as to feed the monitoring result back to the electro-optic modulator. The bias control value is converted into a voltage level by a digital to analog converter (DAC), and applied as a direct current (DC) bias onto the electro-optic modulator. A dither signal is superimposed onto the DC bias for the purpose of bias control. In general, a dither signal with a single frequency is used. The DC bias is controlled such that the frequency component contained in the monitored light and having the same frequency as the dither signal is minimized.

In a communication apparatus equipped with an optical transceiver, electrical amplitude oscillations generated by electric or electronic device, such as a power supply or a PWM circuit, provided around the optical transceiver are mixed as external noise (or electromagnetic waves) into the monitoring PD. The timing of occurrence and the level of such external noise are random, and it is unpredictable when and what level of noise will occur.

If the frequency of the external noise matches the bias control dither signal, the influence of the noise is the most significant. For example, a phase fluctuation may be detected by error, in spite of the actual condition where no bias deviation occurs, or a small amount of bias deviation may be detected as the maximum phase fluctuation. As long as the degree of multilevel modulation is low, the influence of the external noise on the main signal quality is negligible. However, with higher degree of multilevel modulation and the narrower symbol spacing in the complex plane, misdetection of phase fluctuation caused by external noise cannot be ignored.

The PD output is a very small photocurrent on the order of 0.01 mA, and the noise tolerance is low. This small photocurrent is subsequently converted into a voltage signal by a transimpedance amplifier (TIA), and a gain as much as 10,000 times or more is given. When the target component containing the dither frequency is extracted by the bandpass filter (BPF) from the voltage signal, an additional gain of 10 times or more is given by the amplifier (AMP). If external noise is mixed into the PD output, the noise is amplified significantly, together with the detected dither frequency component, and the bias control by the ABC circuit becomes unstable.

FIG. 1B illustrates the influence of disturbance or noise on the main signal quality. With external noise mixed into the PD output due to switching of the power supply or the PWM control circuit for the cooling fans, the PD output fluctuates. A small amount of current change caused in the PD output by the external noise is significantly amplified by a high-gain electric amplifier, and the amount of phase fluctuation estimated by the ABC circuit will increase. In higher degree multilevel modulation with a narrower symbol spacing, a small amount of phase fluctuation caused by the external noise imparts a significant effect on the quality of the main signal. It is necessary for a Mach-Zehnder type IQ modulator performing QPSK to control the respective bias voltages of the I arm, Q arm, and parent modulator to the optimum points, and the influence of the external noise tends to appear on any one of the bias voltages.

In order to suppress the influence of the external noise, which becomes more apparent with increased degree of multilevel modulation, dither signals of multiple frequencies are superimposed onto one bias voltage in a time sharing manner during bias control on the optical modulator according to an embodiment. A bias control value (i.e., a control error) is calculated from the monitoring result of each of the multiple frequencies, and arithmetic processing is performed on the bias control values obtained from the respective frequencies to determine a final bias control value. The arithmetic processing is a process for reducing the influence of noise, which may include calculation of a moving average, mean sum of squares (or the root thereof), or a variance. By determining the final bias control value, which is less affected by noise, from the plurality of bias control values acquired at different frequencies, the influence of external noise is suppressed in the bias control of the optical modulator.

First Embodiment

Figure 2:
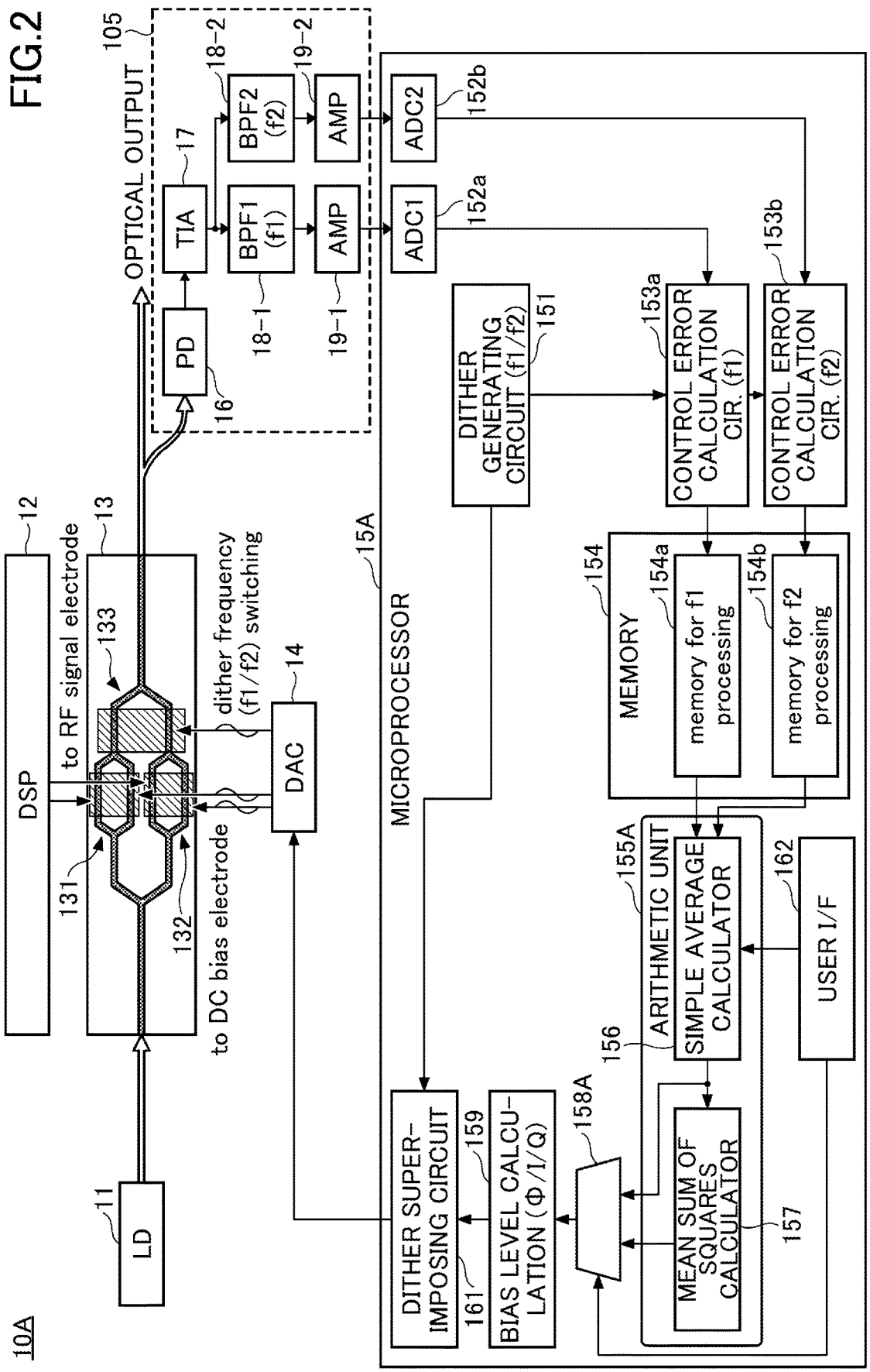
FIG. 2 is a schematic diagram of an optical transmitter according to a first embodiment.

FIG. 2 is a schematic diagram of an optical transmitter 10A according to the first embodiment. The optical transmitter 10A includes an electro-optic modulator 13, a monitor circuit 105 that monitors the output light of the electro-optic modulator 13, and a microprocessor 15A that controls the bias voltage of the electro-optic modulator 13 based on the monitoring results of the monitor circuit 105. The optical transmitter 10A also has a light source 11 that emits a light beam to be input to the electro-optic modulator 13, and a DSP 12 that generates and inputs a data signal to the electro-optic modulator 13. In the following description, the term "bias" or "bias voltage" means a DC bias voltage unless otherwise specified.

The monitor circuit 105 includes a PD 16 that detects a portion of the output light of the electro-optic modulator 13, a TIA 17 that converts the photocurrent output from the PD 16 into a voltage signal and amplifies it, and BPF 18-1 and 18-2 that extract oscillating components of given frequencies from the voltage signal output from the TIA 17. The monitor circuit 105 may include amplifiers 19-1 and 19-2 that amplify the outputs of the BPF 18-1 and BPF 18-2, respectively.

The electro-optic modulator 13 is, for example, an MZ modulator designed to perform quadrature phase shift keying. An MZM 131 that deals with in-phase signals and an MZM 132 that deals with quadrature-phase signals are nested to form a parent MZM 133. The MZM 131 is referred to as an "I-arm MZM 131", and the MZM 132 is referred to as a "Q-arm MZM 132".

The microprocessor 15A applies bias voltages, via a DAC 14, to the respective MZMs of the electro-optic modulator 13. The microprocessor 15A controls the bias voltages applied to the I-arm MZM 131, the Q-arm MZM 132, and the parent MZM 133 so as to maintain the respective MZMs in the appropriate phase conditions. Appropriate phase conditions mean that the phase difference between the two waveguides of the I-arm MZM 131 is 180 degrees, that the phase difference between the two waveguides of the Q-arm MZM 132 is 180 degrees, and that the phase difference between the I arm and the Q arm is 90 degrees, in the absence of signal input. By satisfying the phase conditions, quadrature phase shift keying providing four different phase values of 2-bit information is performed based on the input data signal.

A high-speed data signal is input to the RF signal electrodes of the I-arm MZM 131 and the Q-arm MZM 132 from the DSP 12 such that optical phase modulation is performed at each of the arms. A 90-degree phase difference is applied between the light beams travelling through the I arm and the Q arm. The light beams from the respective arms are combined, and a modulated light signal is output from the electro-optic modulator 13.

The phase conditions of the electro-optic modulator 13 are monitored during operation, and individual bias voltages are applied from the DAC 14 to the DC bias electrodes of the I-arm MZM 131, the Q-arm MZM 132, and the parent MZM 133. The bias voltage applied to the I-arm MZM 131 is referred to as "I bias", the bias voltage applied to the Q-arm MZM 132 is referred to as "Q bias", and the bias voltage applied to the parent MZM 133 is referred to as "Φ bias".

In the embodiment, the same dither signal is used to control the I bias, the Q bias, and the Φ bias. A dither signal is a low-frequency signal that fluctuates with a small amplitude. The "small amplitude" is, for example, an amplitude of several millivolts (mV) to several tens of millivolts. The "low frequency" is a frequency of about several Hz to 1 kHz, which is sufficiently lower than the drive amplitude of the electro-optic modulator 13.

Different frequencies are used as the dither signal, and the frequency of the dither signal superimposed onto a bias voltage is switched between the multiple frequencies. For each of the I bias, the Q bias, and the Φ bias, a section on which the dither signal of the first frequency f1 is superimposed, and a section on which the dither signal of the second frequency f2 is superimposed are provided. The first frequency f1 is, for example, 300 Hz, and the second frequency f2 is 1 kHz. The frequencies of the dither signal are not limited to this example, and another frequency pair, such as 200 Hz and 800 Hz, or 400 Hz and 1 kHz, may be selected as long as at least one of the frequencies does not overlap the frequency of the external noise.

The dither signal of the first frequency f1 and the dither signal of the second frequency f2 oscillate at, for example, the bottom voltage of the modulation curve (or the voltage vs. power characteristic curve). If the bias voltages of the respective MZMs are at the optimum point (i.e., the bottom of the modulation curve in this example), the output of the electro-optic modulator 13 contains a component that oscillates at twice the frequency of f1 or f2. If the bias voltage of any one of MZMs drifts from the bottom of the modulation curve, a dither component that oscillates at the same frequency as f1 or f2 appears in the output of the electro-optic modulator 13. This drift of the bias voltage is detected as a control error (deviation).

Even if external noise occurs during bias control, the influence of the external noise can be avoided at one or both of the frequencies because dither signals of two different frequencies are superimposed onto one bias voltage in a time sharing manner.

With dither signals of different frequencies superimposed onto one bias voltage, a configuration for extracting the power oscillating components of the respective dither frequencies from the output of the PD 16 is needed. For this reason, a BPF 18-1 (denoted as "BPF1" in the figure) for extracting the f1 component, and a BPF 18-2 (denoted as "BPF2" in the figure) for extracting the f2 component are provided after the TIA 17 in the monitor circuit 105. However, the dither extraction is not limited to this example. A frequency tunable BPF may be used so that the dither frequency switching by the microprocessor 15A and the passband switching of the frequency tunable BPF are synchronized with each other.

The frequency component extracted by the BPF 18-1 is amplified by the amplifier 19-1, and input to the microprocessor 15A. The frequency component extracted by the BPF 18-2 is amplified by the amplifier 19-2, and input to the microprocessor 15A.

The microprocessor 15A includes a dither generating circuit 151, ADC 152$a$ and 152$b$, control error calculation circuits 153$a$ and 153$b$, a memory 154, an arithmetic unit 155A, a selector 158A, a bias level calculation circuit 159, a dither superimposing circuit 161, and a user interface (denoted as "I/F") 162.

The dither generating circuit 151 generates dither signals with at least two different frequencies f1 and f2. The dither superimposing circuit 161 alternately superimposes the dither signals of frequencies f1 and f2 onto the DC biases applied to the I-arm MZM 131, the Q-arm MZM 132, and parent MZM 133 of the electro-optic modulator 13, respectively.

The ADC 152$a$ samples and digitalizes a component oscillating at frequency f1 and contained in the optical signal output from the electro-optic modulator 13, and inputs the digital value of the f1 component to the control error calculation circuit 153$a$. The ADC 152$b$ samples and digitalizes a component oscillating at frequency f2 and contained in the optical signal output from the electro-optic modulator 13, and inputs the digital value of the f2 dither component to the control error calculation circuit 153$b$.

The control error calculation circuit 153$a$ performs synchronous detection of the f1 component using the f1 dither signal generated by the dither generating circuit 151. The magnitude (or the amplitude) of the f1 component acquired by the synchronous detection represents the amount of phase deviation of the bias control, that is, the control error (deviation). The control error represents both magnitude and direction (sign) of the phase deviation of the bias voltage. The detected control error of the f1 component is saved in the f1 processing memory 154$a$ of the memory 154 at every bias control cycle.

The control error calculation circuit 153$b$ performs synchronous detection of the f2 component using the f2 dither signal generated by the dither generation circuit 151. The magnitude (or the amplitude) of the f2 component acquired by the synchronous detection represents the amount of phase deviation of the bias control, that is, the control error (deviation). The control error represents both magnitude and direction (sign) of the phase deviation of the bias voltage. The detected control error of the f2 component is saved in the f2 processing memory 154*b* of the memory 154 at every bias control cycle.

The arithmetic unit 155A reads the saved control error values from the f1 processing memory 154*a* and the f2 processing memory 154*b* at the predetermined window size, and performs arithmetic operation for noise reduction. The window size may be set by the operator via, for example, the user I/F 162.

In the first embodiment, the arithmetic unit 155A includes a simple average calculator 156 and/or a mean sum of squares calculator 157. The simple average calculator 156 calculates the moving average of the control errors of the f1 and f2 components, while shifting the window. If the mean sum of squares calculator 157 is used, the simple average calculation result is used, and therefore, both the simple average calculator 156 and the mean sum of squares calculator 157 are used. The calculation results of the simple average and mean sum of squares are input to the selector 158A.

The selector 158A outputs the simple average or the mean sum of squares to the bias value calculation circuit 159 in each control cycle. The value to be selected by the selector may be set in advance through the user I/F 162. With a lower degree of multilevel modulation scheme which does not require highly precise noise reduction, such as QPSK or 16 QAM, a simple average may be selected. With a higher degree of multilevel modulation scheme such as 64 QAM, the mean sum of squares may be calculated.

If a simple average is used statically, the arithmetic unit 155A may successively output the simple average values to the selector 158A without using the mean sum of squares calculator 157. If the mean sum of squares is used statically, the mean sum of squares values may be successively output to the selector 158A. The selector 158A is not indispensable, and either one of the simple average or the mean sum of squares predetermined by the operator may be supplied directly to the bias level calculation circuit 159 from the arithmetic unit 155A.

The bias level calculation circuit 159 calculates a voltage correction value as a control value for each of the Φ bias, I bias, and Q bias, based on the output of the arithmetic unit 155A or the selector 158A, which represents the control error corresponding to the bias phase deviation. The dither superimposing circuit 161 superimposes alternately the dither signals of frequency f1 and frequency f2 onto each of the corrected bias voltages in a time sharing manner. The bias voltage level with the dither signal superimposed is converted by the DAD 14 into an analog voltage and applied to the electro-optic modulator 13 through the corresponding DC bias electrode.

<Simple Average Calculation>

Figure 3:
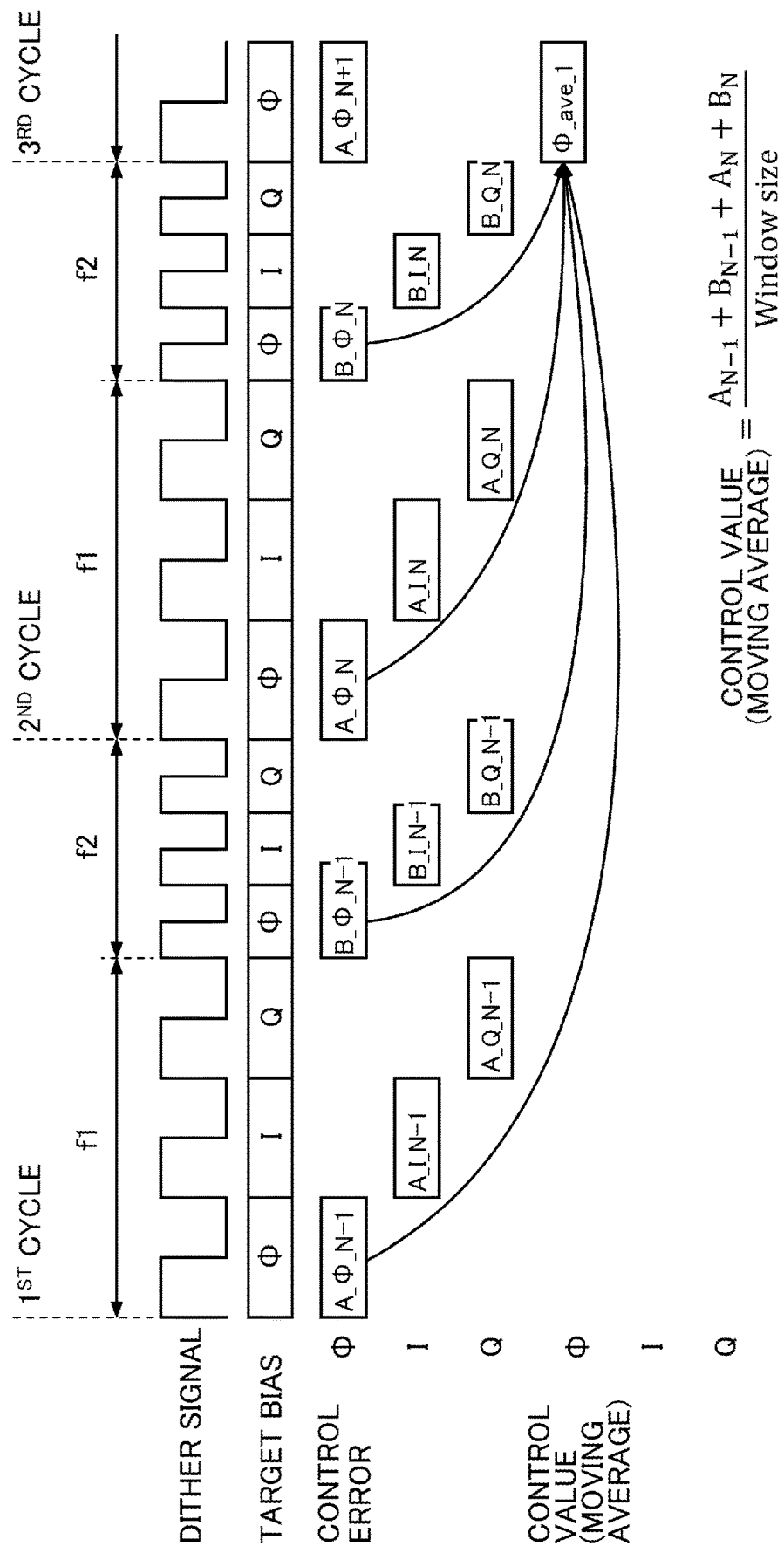
FIG. 3 illustrates an example of arithmetic processing of the bias control in the optical transmitter of FIG. 2.

FIG. 3 illustrates the operation of the simple average calculator 156. A dither signal of frequency f1 and a dither signal of frequency f2 are alternately superimposed onto each of the Φ bias, the I bias, and the Q bias in each bias control cycle. Frequency f1 is 300 Hz and f2 is 1 kHz, for example. The simple averaging process calculates the average value of control errors with the predetermined window size, while shifting the section (cycle), which is calculation of a moving average.

The window size is the total number of data used in one calculation. In the example of FIG. 3, the window size is set to four data items obtained in two cycles; however, the present invention is not limited to this example.

The control value (moving average) is obtained by the following formula for each of the Φ bias, I bias, and Q bias using the control errors detected in each cycle.

$$\text{CONTROL VALUE} = \frac{A_{N-1} + B_{N-1} + A_N + B_N}{\text{Window size}}$$

In the formula, $A_{N-1}$ is the control error of the f1 component in the previous cycle, $B_{N-1}$ is the control error of the f2 component in the previous cycle, $A_N$ is the control error of the f1 component in the current cycle, and $B_N$ is the control error of the f2 component in the current cycle. The average of the total of four data items, two control errors of the f1 component and two control errors of the f2 component, is used as the control value.

For each of the Φ bias, I bias, and Q bias, the control value is calculated by the simple average calculator 156 every time the control errors of two cycles are saved in the memory 154. At the next timing, the window is shifted by one cycle, and the next average is calculated using the control errors of the f1 component and the control errors of the f2 component acquired in the second and the third cycles. If the buffer of the memory 154 has space available, a window size of 3 cycles or more with the total of six or more samples may be set.

<Mean Sum of Squares>

Figure 4:
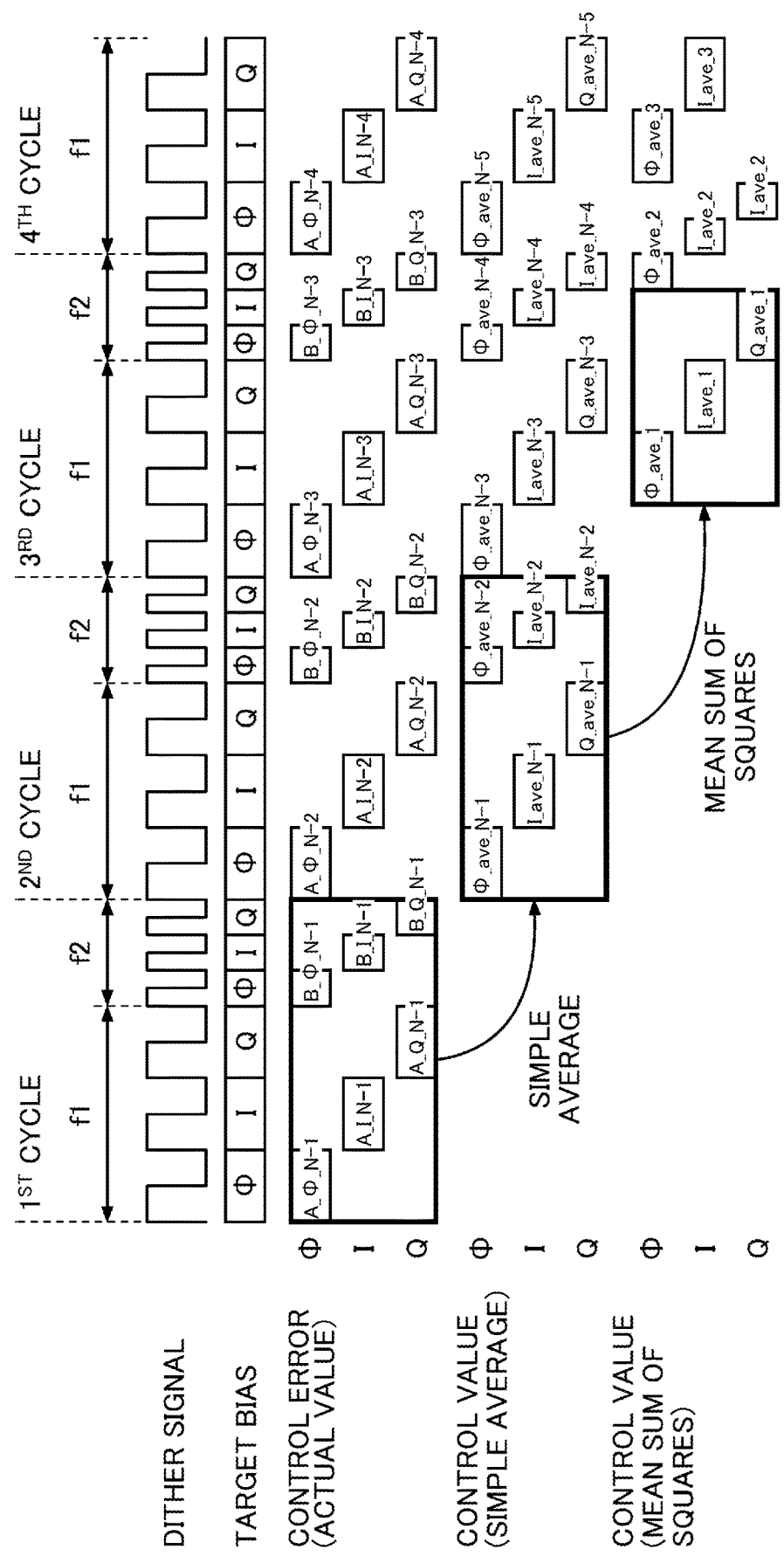
FIG. 4 illustrates another example of arithmetic processing of the bias control in the optical transmitter of FIG. 2.

FIG. 4 illustrates the operation of the mean sum of squares calculator 157. In each bias control cycle, the dither signals of frequency f1 and frequency f2 are superimposed alternately onto each of the Φ bias, I bias, and Q bias. Frequency f1 is 300 Hz and f2 is 1 kHz, for example.

The root mean sum of squares is calculated by the following formula using a simple average value, $$\text{ROOT MEAN SUM OF SQUARES} = \sqrt{\sum_{n=1}^{2} \frac{x_i^2}{2} - \bar{x}^2}$$

where $x_i$ denotes the simple average value of the i-th cycle, and x-bar denotes the average of the simple average values. In this case, two simple average values are used. (n=1, 2). We call the root mean sum of squares simply as "mean sum of squares" in conenience. Focusing on the Φ bias, Φ_ave_N−1 is calculated in the second cycle as a simple average $x_1$, using the control error A_Φ_N−1 of the f1 component and the control error B_Φ_N−1 of the f2 component of the first cycle. Then, Φ_ave_N−2 is calculated as a simple average $x_2$ of the control errors of the f1 component and the f2 component of the second cycle. In the third cycle, the root mean sum of squares Φ_ave_1 is calculated as the mean sum of squares, using the simple averages $x_1$ and $x_2$ and the average x-bar of $x_1$ and $x_2$.

Using the mean sum of squares, the same degree of noise reduction effect can be achieved with a smaller buffer size, compared with expanding the window size of the simple average. By using at least two dither frequencies, the influence of external noise can be reduced even if external noise close to one of the dither frequencies is mixed in.

When the optical transmitter 10A is started up, detection of dither components and calculation of the moving average or the root mean sum of squares may be repeated using a test signal to obtain the simple average or the mean sum of squares for setting the initial bias voltages. By using the simple average or the mean sum of squares, adverse influence of noise can be reduced even if the dither component of either one of f1 or f2 is subjected to the undesirable effect of noise.

Second Embodiment

Figure 5:
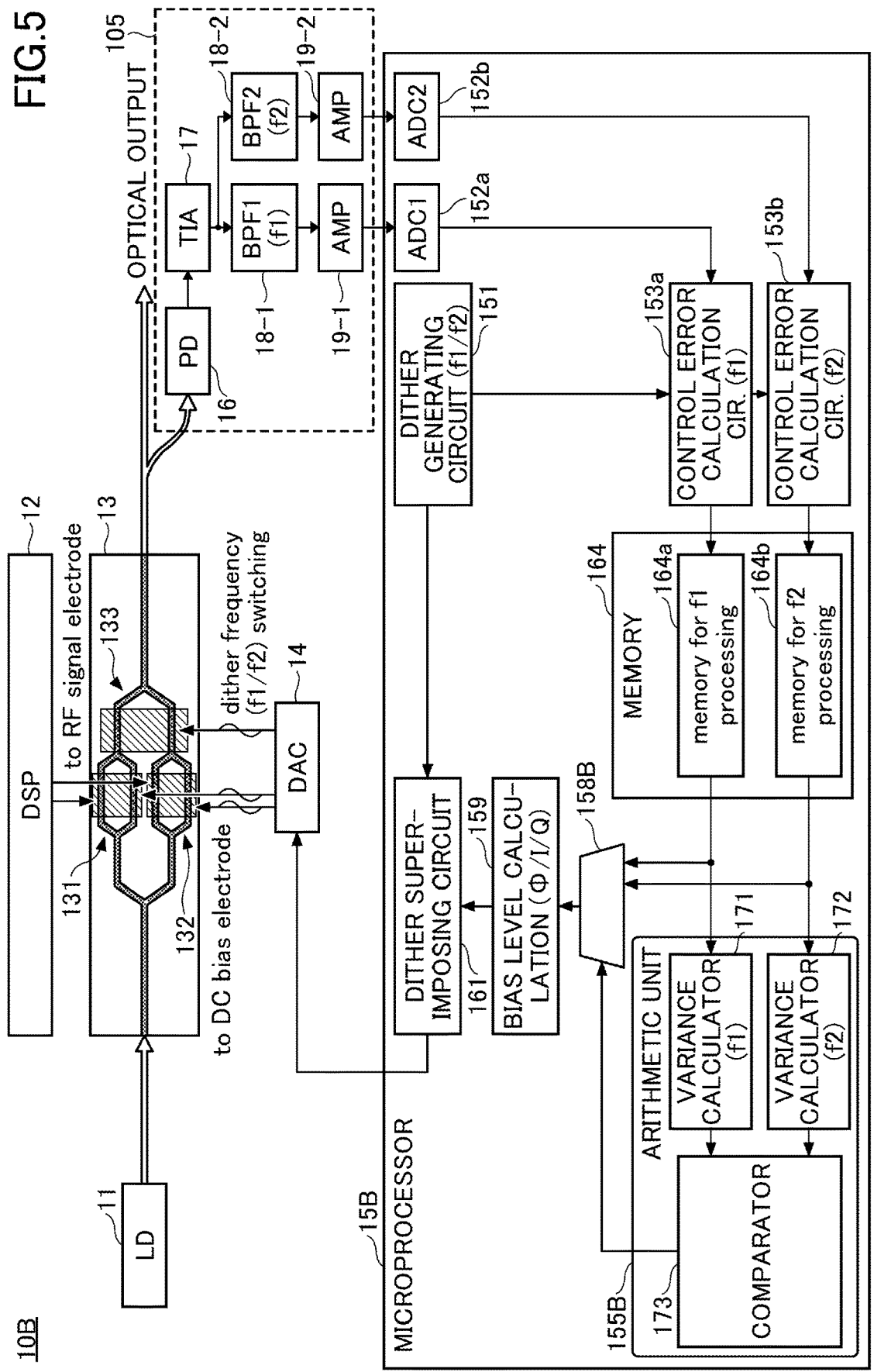
FIG. 5 is a schematic diagram of an optical transmitter according to a second embodiment.

FIG. 5 is a schematic diagram of an optical transmitter 10B according to the second embodiment. In the second embodiment, the varance is calculated in an arithmetic process for noise reduction.

The optical transmitter 10B includes an electro-optic modulator 13, a monitor circuit 105 that monitors the light beam output from the electro-optic modulator 13, and a microprocessor 15B that controls the bias voltages of the electro-optic modulator 13 using the monitoring results of the monitor circuit 105. The optical transmitter 10B also has a light source 11 and a DSP 12. The second embodiment also uses dither signals of two different frequencies f1 and f2 to calculate a variance. In the monitor circuit 105, BPF 18-1 for extracting a f1 component whose power oscillates at the same frequency as f1, and BPF 18-2 for extracting a f2 component whose power oscillates at the same frequency as f2 are provided after the TIA 17. The frequency component extracted by BPF 18-1 is amplified by the amplifier 19-1 and input to the microprocessor 15B. The frequency component extracted by the BPF 18-2 is amplified by the amplifier 19-2 and input to the microprocessor 15B.

The microprocessor 15B has a dither generating circuit 151, ADCs 152a and 152b, a control error calculation circuit 153a and 153b, a memory 164, an arithmetic unit 155B, a selector 158B, a bias level calculation circuit 159, and a dither superimposing circuit 161.

The dither generating circuit 151 generates dither signals having at least two different frequencies f1 and f2. The dither superimposing circuit 161 alternately superimposes the dither signals of frequencies f1 and f2 onto the DC bias applied to each of the I-arm MZM 131, Q-arm MZM 132, and parent MZM 133 of the electro-optic modulator 13 in a time sharing manner.

The ADC 152a digitally samples the component contained in the optical signal output from the electro-optic modulator 13 and oscillating at frequency f1, and inputs the digital data of the f1 oscillating component to the control error calculation circuit 153a. The ADC 152b digitally samples the component contained in the optical signal output from the electro-optic modulator 13 and oscillating at frequency f2, and inputs the digital data of the f2 oscillating component to the control error calculation circuit 153b.

The control error calculation circuit 153a synchronously detects the f1 component using the f1 dither signal generated by the dither generating circuit 151. The magnitude of the synchronously detected f1 component represents the amount of phase deviation in the bias control, that is, the control error (deviation). The control error contains both the magnitude and the direction (sign) of the phase deviation. The detected control error of the f1 component is saved in the f1 processing memory 164a of the memory 164 in each bias control cycle.

The control error calculation circuit 153b synchronously detects the f2 component using the f2 dither signal generated by the dither generating circuit 151. The magnitude of the synchronously detected f2 component represents the amount of phase deviation in the bias control, that is, the control error (deviation). The control error contains both the magnitude and the direction (sign) of the phase deviation. The detected control error of the f2 component is saved in the f2 processing memory 164b of the memory 164 in each bias control cycle.

The memories 164a and 164b save the control errors of predetermined number of cycles (N cycles, N is a natural number) for each of the Φ bias, the I bias, and the Q bias.

The arithmetic unit 155B reads the saved control error values from the f1 processing memory 154a and the f2 processing memory 154b at each calculation window, and performs an arithmetic operation for noise reduction. The window size may be set in advance, or may be set by the operator via the user I/F as in FIG. 2.

The calculator 155B includes a variance calculator 171 that calculates the variance of the control errors of the f1 component, a variance calculator 172 that calculates the variance of the control errors of the f2 component, and a comparator 173 that compares the variances of the f1 component and the f2 component.

The comparator 173 selects either one of frequency f1 or frequency f2 having the smaller variance, and notifies the selector 158B of the selection result, namely, the frequency with the smaller variance.

The variance (σ^2) is calculated based on the following formula for each frequency of the dither signal and each type of bias voltage.

$$\sigma^2 = \frac{1}{n}\sum_{n=1}^{n}(x_i - \overline{x})^2$$

where σ is the standard deviation, n is the number of samples, $x_i$ is the control error of the i-th cycle of interest, and x-bar is the average of the control errors of n samples.

The selector 158B receives the currently processed control errors from the f1 processing memory 164a and the f2 processing memory 164b in each bias control cycle. The selector 158B selects the control error of the frequency component having the smaller variance, based on the comparison result of the comparator 173, and outputs the selected control error to the bias level calculation circuit 159.

The bias value calculation circuit 159 calculates a voltage correction value to update the DC bias, based on the control error representing the amount of phase deviation output from the selector 158B, for each of the Φ bias, the I bias, and the Q bias. A dither signal with frequency f1 and a dither signal with frequency f2 are alternately superimposed onto the updated (corrected) bias level of each of the Φ bias, the I bias, and the Q bias in a time sharing manner by the dither superimposing circuit 161. The bias level on which the dither signal is superimposed is converted into an analog voltage by the DAC 14 and applied to the electro-optic modulator 13 through the DC bias electrodes.

<Calculation of Variance>

Figure 6:
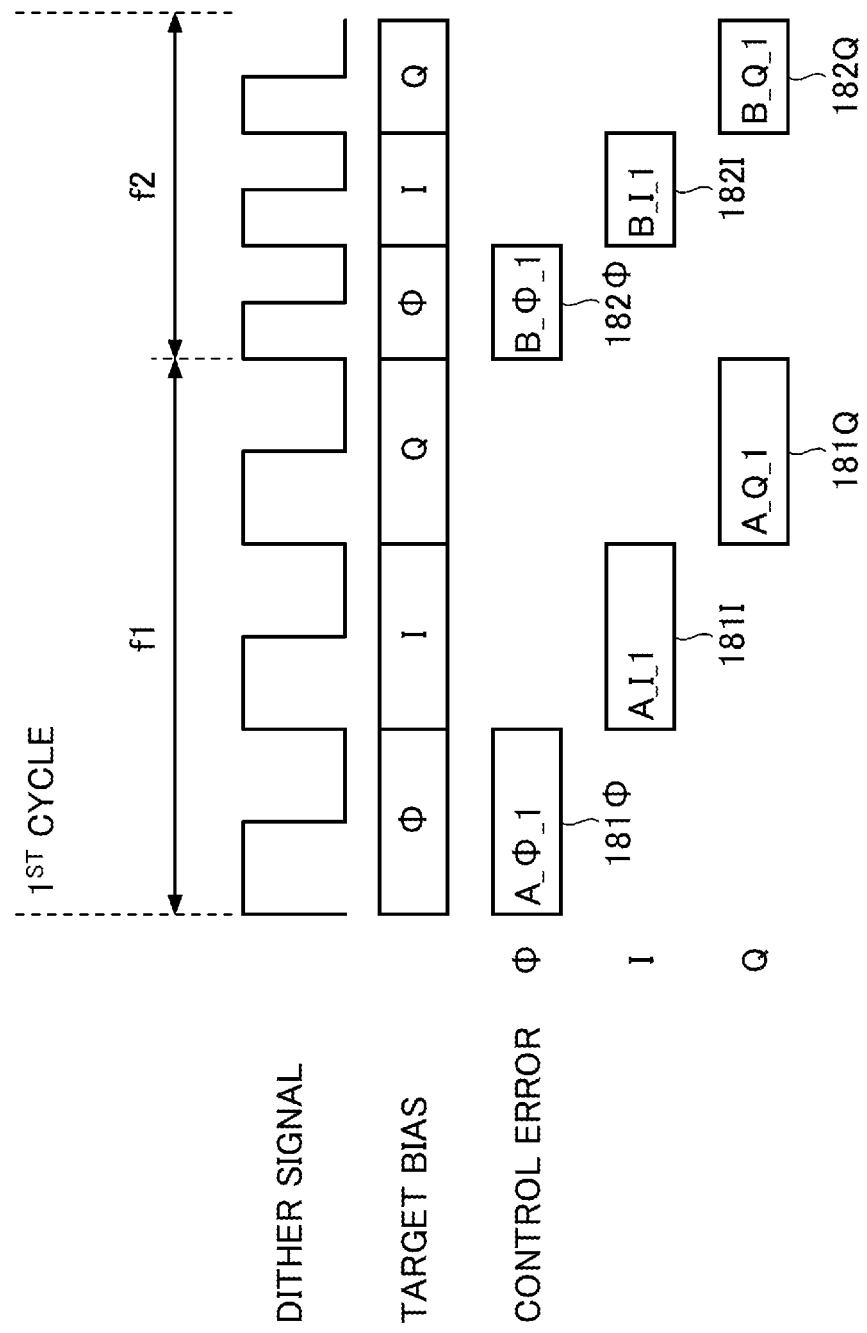
FIG. 6 illustrates an example of arithmetic processing of the bias control in the optical transmitter of FIG. 5.

FIG. 6 illustrates an operation for calculating a variance. In each control cycle, dither signals with frequency f1 and frequency f2 are alternately superimposed onto each of the Φ bias, the I bias, and the Q bias. For each of the bias voltages, a control error (phase deviation) of the f1 component and a control error (phase deviation) of the f2 component are calculated by the control error calculation circuits 153a and 153b, respectively. The calculated control errors are sequentially saved in a predetermined field of the memory 164.

In the first cycle, the control error A_Φ_1 (181Φ) of the f1 component and the control error B_Φ_1 (182Φ) of the f2 component are acquired for the bias. Similarly, the control error A_I_1 (181I) of the f1 component and the control error B_I_1 (182I) of the f2 component are acquired for the I bias, and the control error A_Q_1 (181Q) of the f1 component and the control error B_Q_1 (182Q) of the 12 component are acquired for the Q bias.

FIG. 7 illustrates an example of a control value saving table stored in the memory 164. For each type of bias or MZM arm, control errors detected under superimposition of dither frequency f1 are successively recorded in the corresponding addresses of the f1 processing memory 164a. Smilarly, control errors detected under superimposition of dither frequency f2 are successively recorded in the corresponding addresses of the f2 processing memory 164b.

The variance calculator 171 calculates a variance of the f1 control errors from the n control errors of the f1 component for each of the biases. The variance calculator 172 calculates a variance of the f2 control errors from the n control errors of the f2 component for each of the biases. The calculated variances may be written back to the control value saving table.

The variances of the two frequency components are compared, and the detected control error of either one of the frequencies having the smaller variance is used for bias control. The other control error detected from the frequency component with a greater variance is considered to be greatly affected by external noise, and it may not be suitable for bias control. For example, concerning the Φ bias, if the variances of the f1 component and the f2 components are 0.23 and 0.01, respectively, then the Φ bias is controlled using the control error detected from the f2 component, which appears to be less affected by the external noise. The same applies to the I bias and the Q bias.

The influence of noise can be reduced by using the control error detected from the frequency component with the smaller variance for each of the biases. The configuration of the second embodiment can provide a higher effect of noise suppression because bias control is performed taking the presence or absence of the influence of noise, or the degree of the influence of noise into account.

<Bias Control Process>

Figure 8:
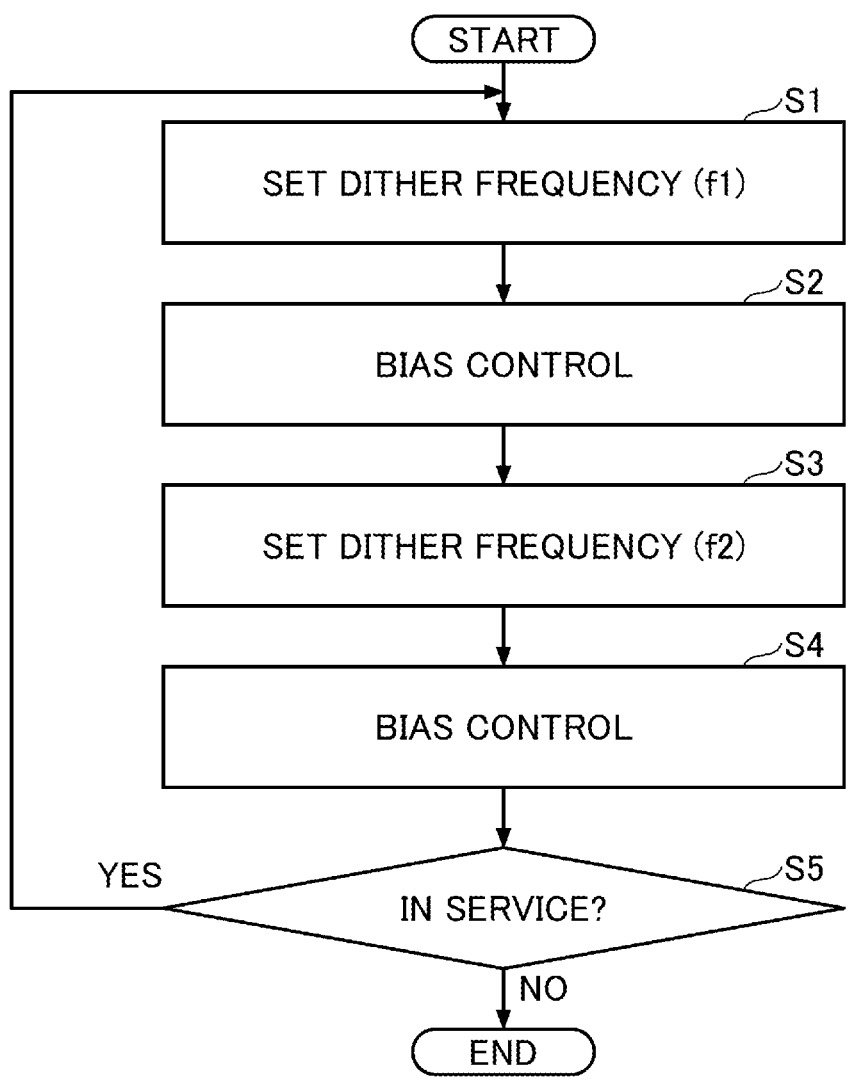
FIG. 8 is a basic flowchart of bias control according to an embodiment.

FIG. 8 is a basic flowchart of bias control according to the embodiment. A first frequency (f1) is set for the dither signal which is to be superimposed onto the DC biases of the respective arms of the electro-optic modulator 13 (S1). Then bias control using the f1 dither signal is performed (S2). In the bias control, a component oscillating at the same frequency as the f1 dither signal is detected from the optical power output from the electro-optic modulator, and a control error is calculated from the oscillating component. The control error calculated for f1 is saved in a predetermined field of the memory 154 (FIG. 2) or the memory 164 (FIG. 5).

Next, a second frequency (f2) is set for the dither signal which is superimposed onto ole DC biases of the respective arms of the electro-optic modulator 13 (S3). Then, bias control using the f2 dither signal is performed (S4). In this bias control, a component oscillating at the same frequency as the f2 dither signal is detected from the optical power output from the electro-optic modulator, and a control error is calculated from the oscillating component. The control error calculated for f2 is saved in a predetermined field of the memory 154 or 164. The saved control errors of f1 and f2 are subjected to arithmetic processing for noise reduction, and a correction value for the current bias voltage of each arm is determined. Steps S1 to S4 are repeated during the service of the optical transmitter 10A or 10B (which may be hereinafter collectively referred to as an "optical transmitter 10") (YBS in S5).

Figure 9:
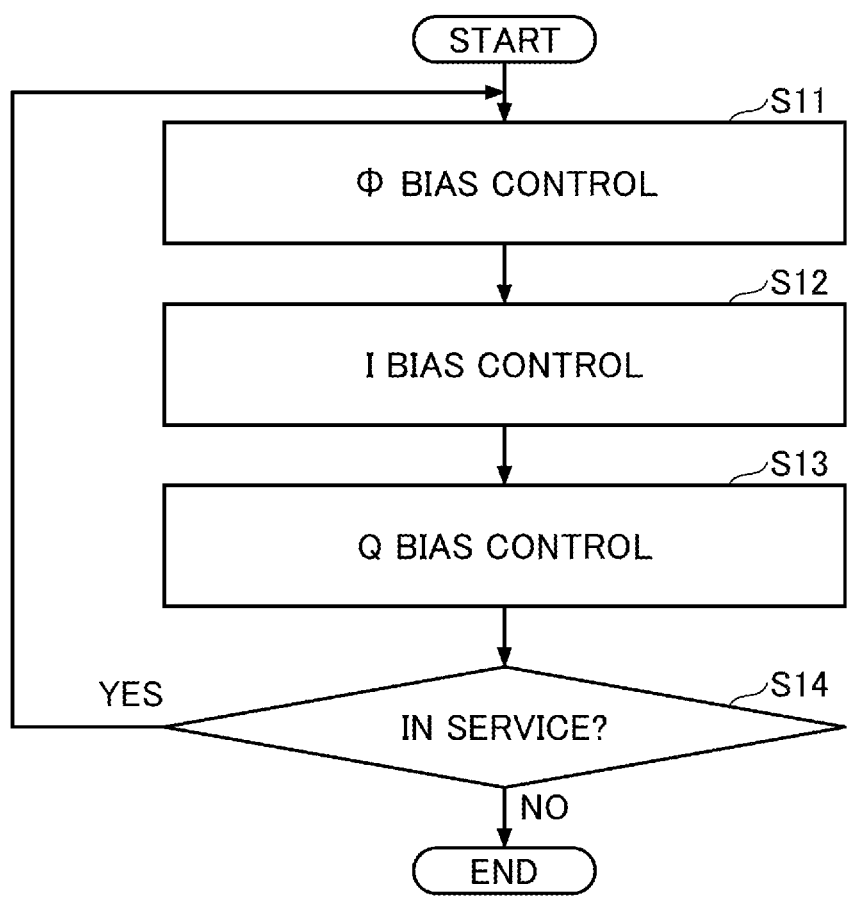
FIG. 9 is a flowchart of bias control on the respective arms.

FIG. 9 is a flowchart of the bias control process of the respective arms. The first bias of the electro-optic modulator 13 is controlled (S11). In this example, the first bias is the Φ bias applied to the parent MZM. The Φ bias is a DC bias for maintaining the phase difference between the light beams passing through the I arm and the Q arm at 90 degrees in the absence of signal input.

The second bias of the electro-optic modulator 13 is controlled (S12). In this example, the second bias is the I bias applied to the I arm. The I bias is a DC bias for maintaining the light beams passing through the two waveguides of the I-arm MZM in 180-degree out of phase in the absence of signal input.

The third bias of the electro-optic modulator 13 is controlled (S13). In this example, the third bias is the Q bias applied to the Q arm. The Q bias is a DC bias for maintaining the light beams passing through the two waveguides of the Q-arm MZM in 180-degree out of phase in the absence of signal input.

If the Φ bias, the I bias, and the Q bias are controlled in a time sharing manner, there is no particular limitation to the sequential order of steps S11, S12, and S13. If the Φ bias, the I bias, and the Q bias are controlled in parallel, microprocessors 15A or 15B are provided for the corresponding bias control operations to simultaneously control the Φ bias, the I bias, and the Q bias. In the service of the optical transmitter 10 (YES in S14), steps S11 to 13 are repeated.

Figure 10:
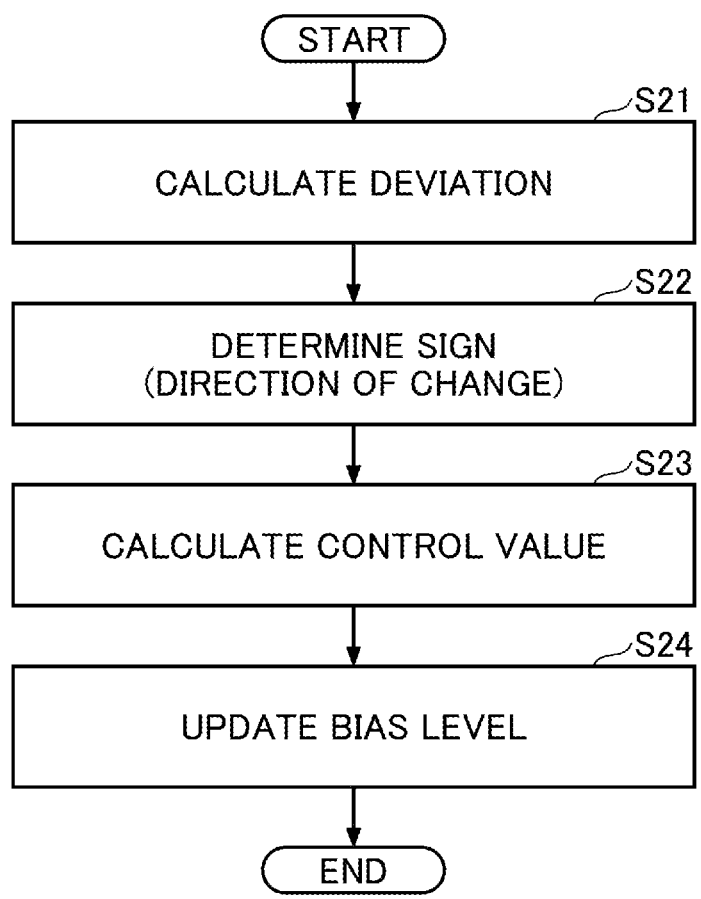
FIG. 10 is a flowchart of a particular process of bias control in FIG. 9.

FIG. 10 is a flowchart showing a specific bias control operation in each of the steps S11, S12, and S13 of FIG. 9. First, a portion of the optical signal output from the electro-optic modulator 13 is monitored by the PD 16, and a component oscillating at the same frequency as the applied dither signal is detected and extracted from the optical output power. The bias voltage is controlled based on the magnitude of the oscillating component. The control error, that is, the deviation of the bias voltage is calculated based on the amplitude of the detected oscillating component (S21). Then, a plus or minus sign indicating the control direction is determined (S22). If the control error is changing in the decreasing direction, the current direction of control is correct, and the sign is positive. If the control error is changing in the increasing direction, the sign is negative because the control direction is in the opposite direction.

Then, arithmetic processing is performed (S23) using the deviation (or the control error) obtained in S21. Any types of arithmetic processing may be employed, including calculation of the moving average in FIG. 3, calculation of mean sum of squares in FIG. 4, and comparison of the variances ($\sigma^2$) in FIG. 5, as long as a noise reduction effect is achieved. Finally, the current bias value is updated (S24) based on the sign determined in S22 and the control value acquired in the arithmetic processing of S23. Regardless of which arithmetic processing is used, a control value with less influence of noise is selected, and quality of the main signal is maintained by suppressing signal deterioration, especially when a higher degree multilevel modulation scheme is used.

FIG. 11 illustrates the outlines and the effects of the respective arithmetic processing used in the embodiments. As illustrated in FIG. 3, the simple average is a moving average of the total of M control errors calculated at the dither frequencies f1 and f2. With two frequencies of f1 and f2, M is an integral multiple of 2, and M/2 control errors of f1 component and M/2 control errors of f2 component are used. Even if a noise with a frequency close to one of the dither frequencies has occurred, the influence of the noise is reduced by using the moving average. Moreover, calculation of a moving average is a simple operation, and the arithmetic processing circuit is simplified.

Calculation of mean sum of squares uses a plurality of simple averages $x_i$, each being the average of the control errors of the f1 component and the f2 component, which are calculated using the total of M control errors for the f1 and f2 components. With two different frequencies, M is an integer multiple of 2 greater than or equal to 4. Using M/2 control errors of f1 components and M/2 control errors of f2 components, the root of the mean sum of squares is calculated from, the simple averages $x_i$ and the average x-bar of the simple averages. Even if noise with a frequency close to one of the dither frequencies has occurred, the influence of the noise can be reduced by calculating the mean sum of squares. Compared with the case for expanding the window size of simple average calculation to improve the noise reduction effect, the same degree of noise reduction effect can be achieved with a smaller buffer size.

As to the noise reduction using variance ($\sigma^2$), a variance of each of the f1 component and the f2 component is calculated using the total of M control errors detected from the f1 and f2 components. With two different frequencies, M is an integer multiple of 2 greater than or equal to 4. The variance of the control errors of the f1 component is calculated using M/2 control errors, and the variance of the f2 component is calculated using M/2 control errors. The control value is determined using the control error of a dither frequency having a smaller variance. Even if influence of noise is contained in one of the frequency components, such noise influence can be eliminated by avoiding to use this frequency component for bias control. Because the presence or absence, or the degree of the influence of noise is considered to remove the influence of noise, the noise reduction effect is high.

<Verification of Effect>

Figure 12A:
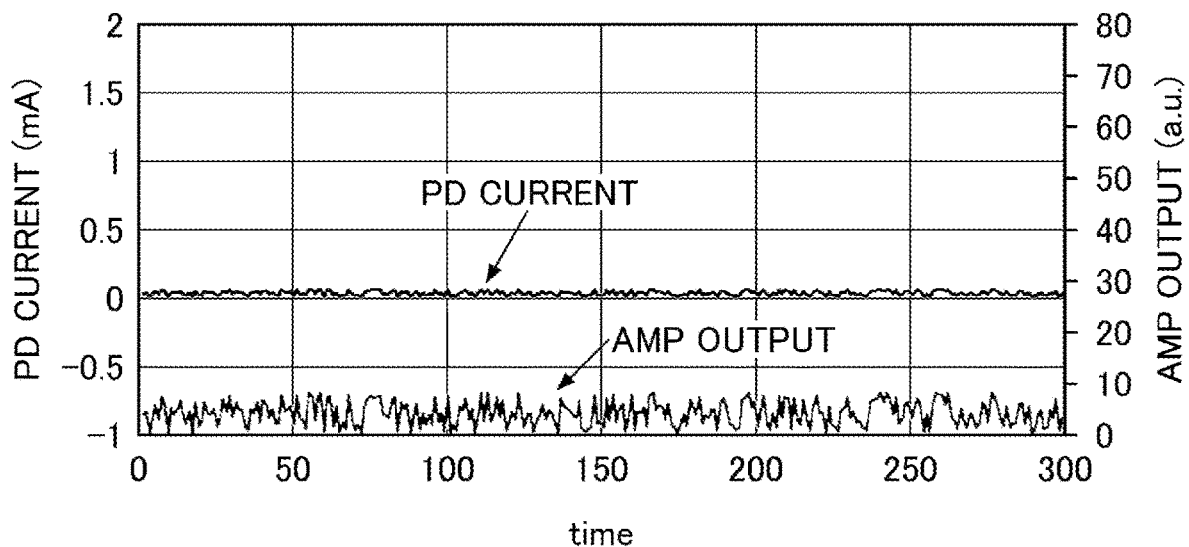
FIG. 12A is a diagram for confirming the effect and illustrates a current level of the monitor signal without disturbance.
Figure 12B:
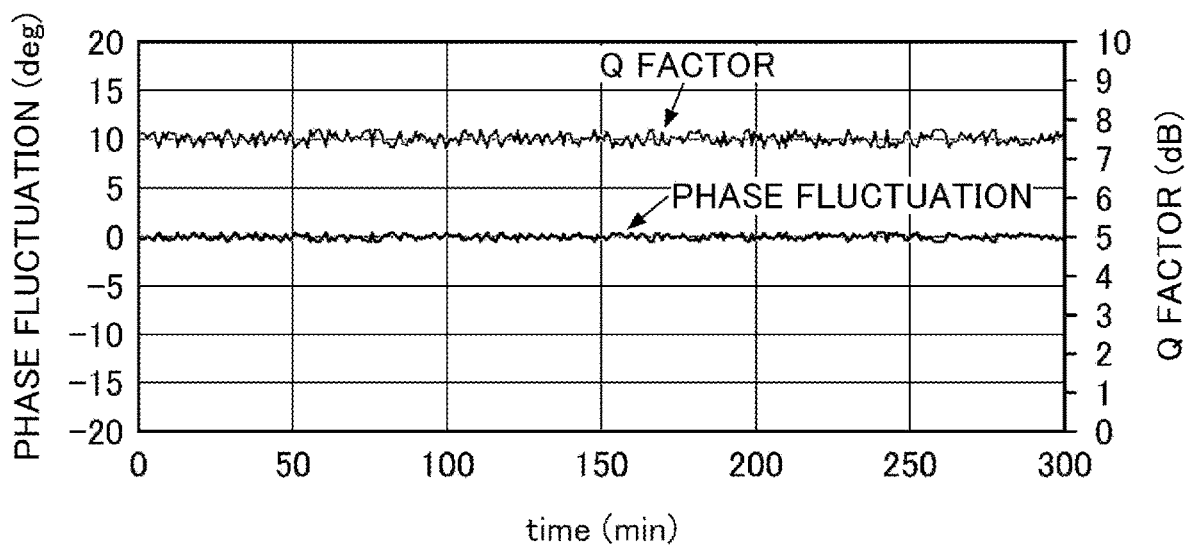
FIG. 12B is a diagram for confirming the effect and illustrates the amount of phase fluctuation without disturbance.
Figure 13A:
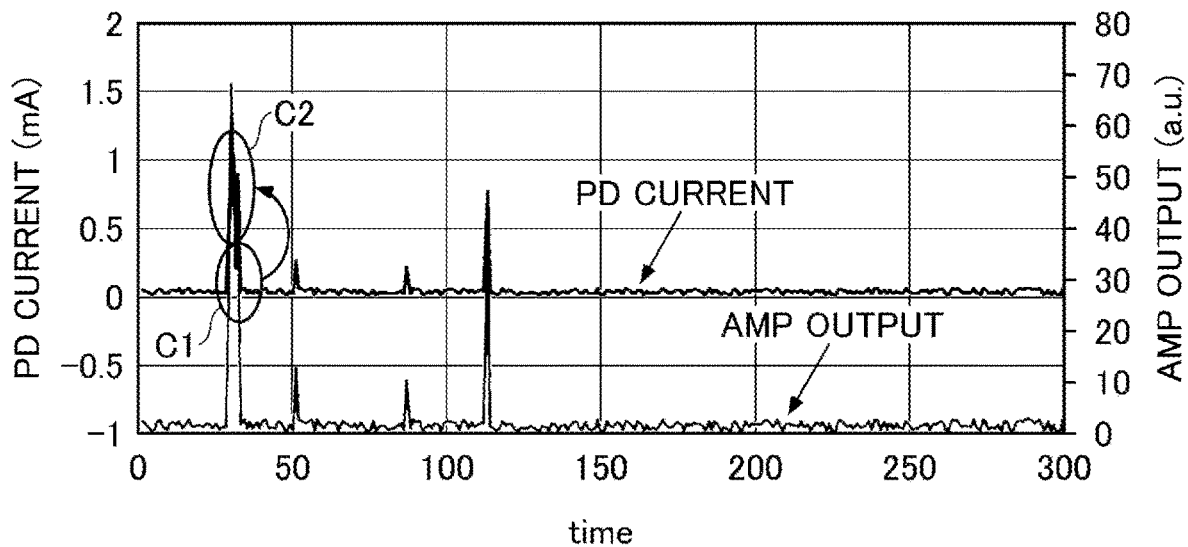
FIG. 13A is a diagram for confirming the effect and illustrates a current level of the monitor signal with disturbance or noise occurring in the conventional bias control.
Figure 13B:
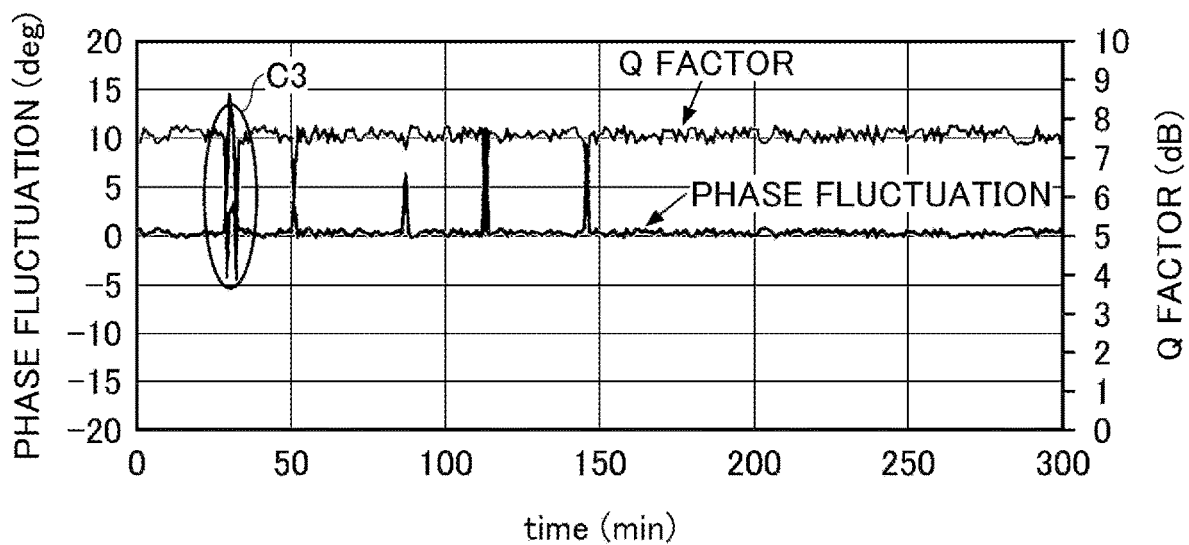
FIG. 13B is a diagram for confirming the effect and illustrates the amount of phase fluctuation with disturbance or noise occurring in the conventional bias control.
Figure 14A:
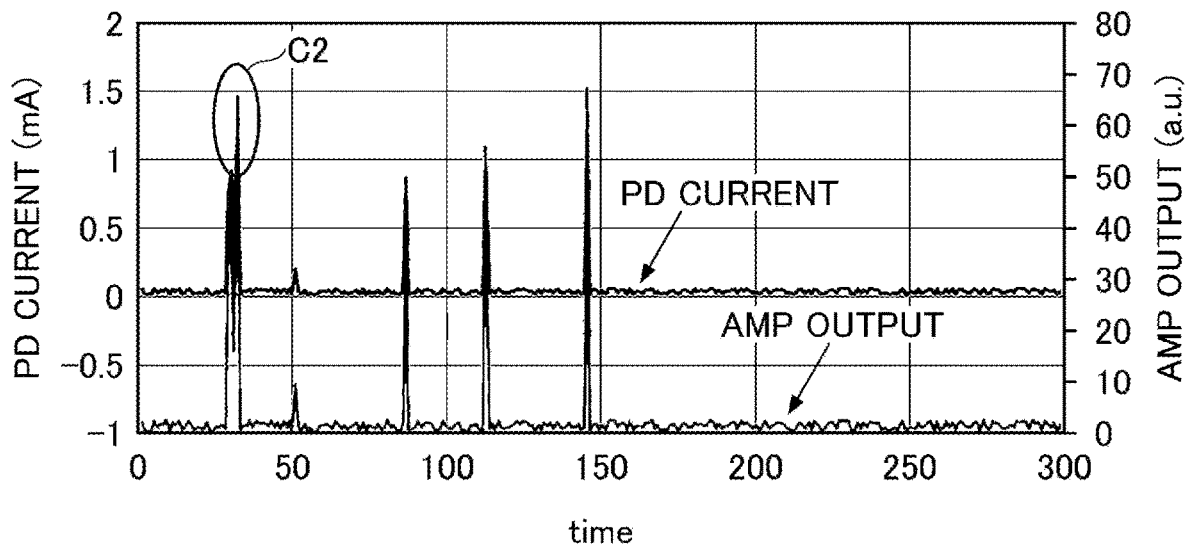
FIG. 14A is a diagram for confirming the effect and illustrates a current level of the monitor signal with disturbance or noise occurring in the bias control according to the embodiment.
Figure 14B:
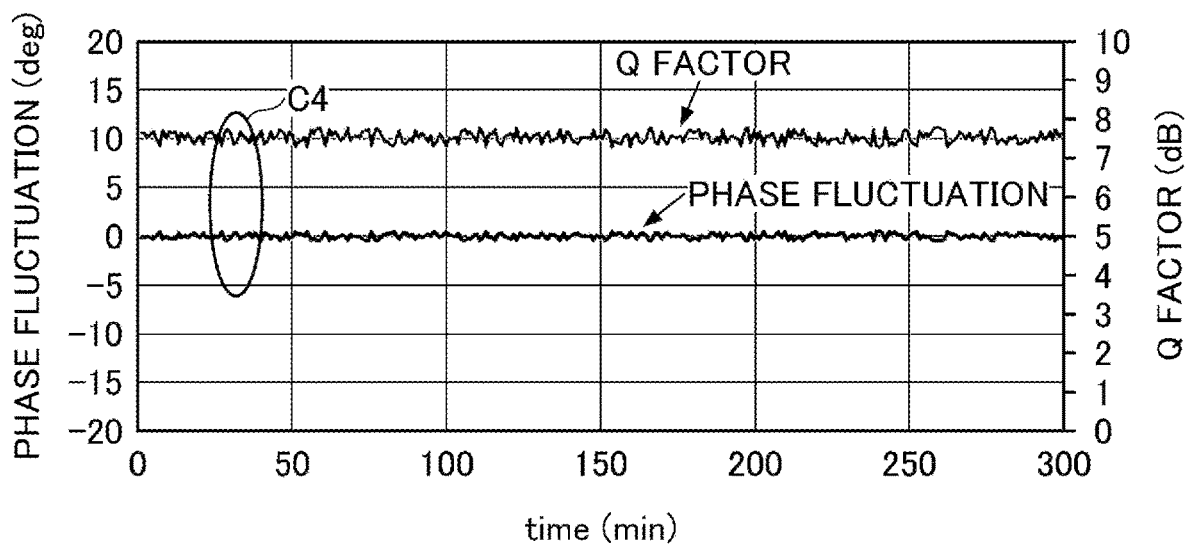
FIG. 14B is a diagram for confirming the effect and illustrates the amount of phase fluctuation with disturbance or noise occurring in the bias control according to the embodiment.

FIG. 12A to FIG. 14B are diagrams for confirming the noise reduction effect. FIG. 12A illustrates a monitor signal, and FIG. 12B illustrates phase fluctuation without disturbance or external noise. FIG. 13A illustrates a monitor signal, and FIG. 13B illustrates phase fluctuation with disturbance or external noise occurring in the conventional bias control. FIG. 14A illustrates a monitor signal, and FIG. 14B illustrates phase fluctuation with disturbance or external noise occurring in the bias control of the embodiment.

In FIG. 12A and FIG. 12B, the horizontal axis represents time. The left-hand side vertical axis on FIG. 12A represents PD current (mA), and the right-hand side vertical axis represents output of the amplifier. Without external noise, a weak PD current can be acquired as a monitor signal of the electro-optic modulator. This PD current is amplified and converted into a voltage signal by the TIA and the amplifier in the subsequent stage, and input to the ADC.

In FIG. 12B, the left-hand side vertical axis represents the amount of phase fluctuation (degrees), and the right-hand vertical axis represents the Q factor (dB). Without external noise, the amount of phase fluctuation is within a predetermined range, and the fluctuation in the Q factor is also within an acceptable range.

In FIG. 13A, upon external noise occurring in the conventional bias control without noise suppressing measures, a significant fluctuation component C1 is observed in the PD current. External noise is generated irregularly depending on the environment and situation in which the optical transmitter is used. The fluctuation component C1 appearing in the PD current is converted into a large voltage fluctuation C2 by the TIA and the amplifier.

In FIG. 13B, in the calculation of the bias control value based on the PD output, the significant voltage fluctuation C2 is detected as the phase deviation C3. If bias control is performed based on the significant phase deviation C3, that bias control does not match the actual bias state, and the Q factor is greatly deteriorated. As a result, the operation of the electro-optic modulator becomes unstable.

In FIG. 14A, upon occurrence of external noise in the bias control according to the embodiment, the PD current fluctuates as in FIG. 13A, and a significant voltage fluctuation C2 is contained in the monitor signal input to the ADC of the microprocessor 15.

In FIG. 14B, when the bias control value is calculated based on the PD output, the influence of the voltage fluctuation C2 is reduced by the arithmetic processing for noise reduction. Unlike FIG. 13B, the amount of phase fluctuation does not greatly change, as indicated by the circle C4, and the Q factor which represents the signal quality is maintained at the satisfactory level.

By using two or more frequencies for the dither signal to be superimposed onto one bias, adverse influence of disturbance or external noise can be avoided with at least one of the frequencies used, even if unpredictable disturbance or noise occurs, and error detection can be minimized. If the frequency of the expected noise is known in advance, the noise reduction effect can be further improved by selecting dither frequencies other than the noise frequency for two or more frequencies of the dither signal.

<Application to Communication Devices>

Figure 15:
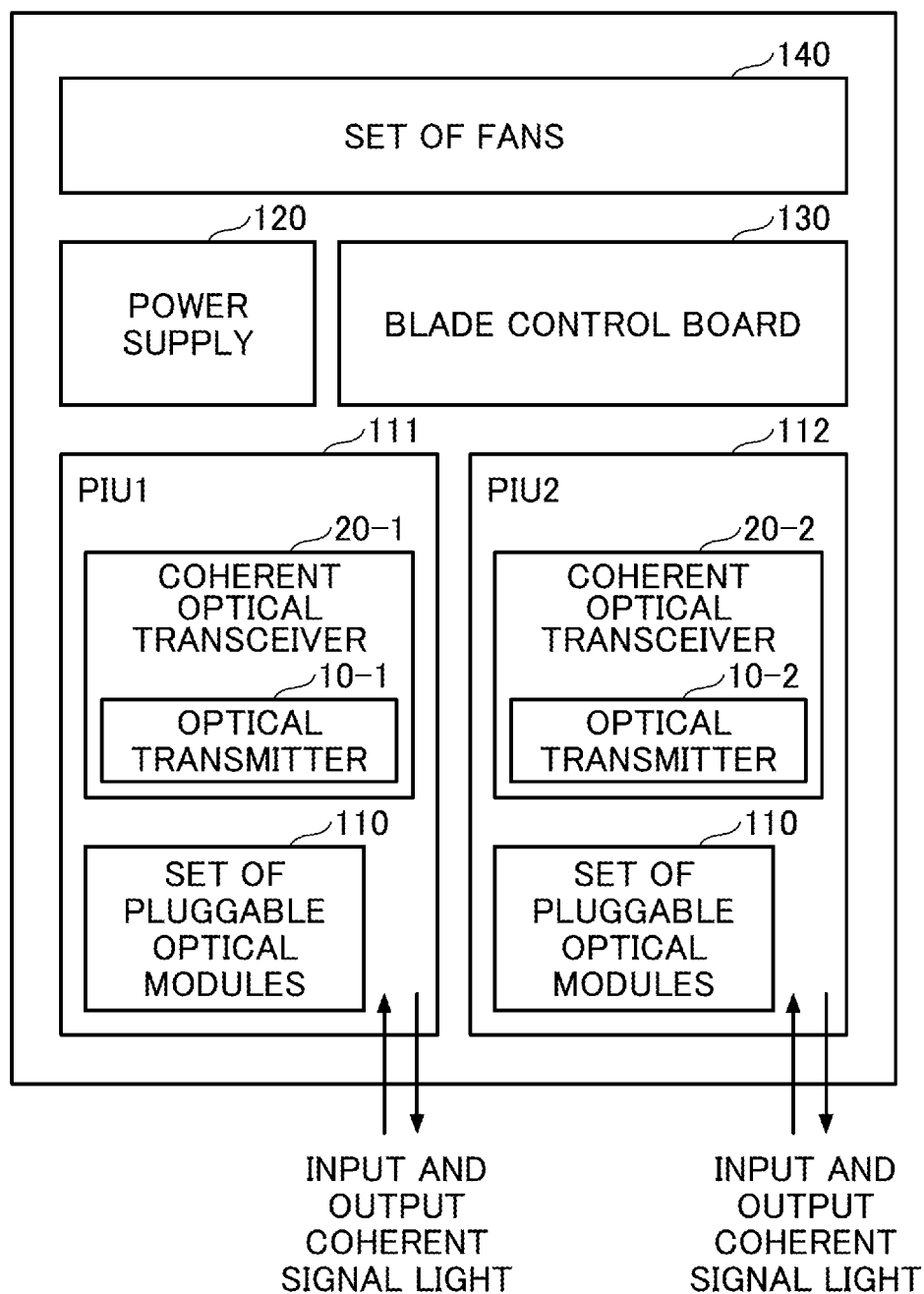
FIG. 15 is a schematic diagram of a communication apparatus using the optical transmitter of the embodiment.

FIG. 15 is a schematic diagram of a communication apparatus 100 using the optical transmitters 10-1 and 10-2 of the embodiment. The communication apparatus 100 includes a plurality of plug-in units 111 and 112, and electrical or electronic devices involved in the operation of the plug-in units 111 and 112. Examples of the electrical or electronic device include, but are not limited to a power supply 120, a blade control board 130, and a set of fans 140 such as a plurality of cooling fans. A plug-in unit is a device or a subassembly that can be plugged into a corresponding socket for connection with the main body of the communication apparatus 100.

The plug-in units 111 and 112 of a blade type are connected to the communication apparatus 100, and controlled by the blade control board 130. The power supply 120 is on/off controlled when the plug-in units 111 and 112 are inserted or removed, replaced, or newly added. The set of fans 140 may have a PWM circuit that controls the temperature of each of the cooling fans.

The plug-in unit 111 includes a coherent optical transceiver 20-1 having an optical transmitter 10-1 and a set of pluggable optical modules 110. The set of pluggable optical modules 110 includes a plurality of optical modules connected to an optical fiber via an optical connector. The coherent optical transceiver 20-1 has a coherent optical receiver, together with the optical transmitter 10-1. The coherent optical receiver receives and detects a modulated optical signal, making use of the interference with locally oscillated light.

In the optical transmitter 10-1 of the coherent optical transceiver 20-1, bias control is performed by suppressing the influence of external noise. Even if noise occurs due to the switching operation of the power supply 120 or the PWM circuit for the set of fans 140 provided in proximity to the plug-in unit 111, the influence of the noise is suppressed in the above-described bias control, and the quality of the optically modulated signal output from the optical transmitter 10-1 is maintained.

The plug-in unit 112 has the same configuration as the plug-in unit 111, and includes a coherent optical transceiver 20-1 having an optical transmitter 10-2 and a set of pluggable optical modules 110. The optical transmitter 10-2 also performs bias control, while suppressing the influence of noise, and transmits a modulated optical signal with good signal quality.

Although the configuration and the bias control scheme of the optical transmitter 10 of the embodiment have been described above based on the specific examples, the bias control technique of the present invention is not limited to the above-described examples. The monitor circuit 105 may have any other suitable configurations as long as it can extract a power component oscillating at the same frequency as the dither signal. In addition to the simple averaging, calculation of mean sum of squares, and comparison of variances, other arithmetic processing such as smoothing or median filtering suitable for noise reduction may be employed. Instead of controlling the Φ bias, the I bias, and the Q bias in a time sharing manner, the hardware resources and the functions of the microprocessor 15 may be divided to simultaneously control the Φ bias, the I bias, and the Q bias in parallel. The electro-optic modulator is not limited to a QPSK modulator, and a dual polarization QPSK modulator may be used. In this case, the bias control described above is performed for each of the two orthogonal polarizations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the scope of the invention.

What is claimed is:

1. An optical transmitter comprising:
an electro-optic modulator;
a monitor circuit that monitors output light of the electro-optic modulator; and
a processor that controls a bias voltage of the electro-optic modulator using a monitoring result of the monitor circuit,
wherein the processor superimposes a first dither signal with a first frequency and a second dither signal with a second frequency different from the first frequency, onto one bias voltage in a time sharing manner, calculates a first control error based on a first component oscillating at the first frequency and a second control error based on a second component oscillating at the second frequency based on the monitoring result, and determines a control value for controlling the bias voltage using the first control error and the second control error,
wherein the electro-optic modulator is a Mach-Zehnder modulator in which a first child modulator and a second child modulator are nested to form a parent modulator, and
wherein the processor superimposes the first dither signal onto each of a first bias for the first child modulator, a second bias for the second child modulator, and a third bias for the parent modulator in a first section of a bias control cycle to detect the first component from the output light of the electro-optic modulator, and superimposes the second dither signal onto each of the first bias, the second bias, and the third bias in a second section of the bias control cycle to detect the second component from the output light of the electro-optic modulator.

2. The optical transmitter as claimed in claim 1, wherein the processor performs an arithmetic calculation using the first control error and the second control error, and determines the control value based on a result of the arithmetic calculation.

3. The optical transmitter as claimed in claim 1, wherein the processor calculates a simple average or a mean sum of squares of the first control error and the second control error, and determines the control value based on a calculation result.

4. The optical transmitter as claimed in claim 3, wherein the processor has a selector that selects one of the simple average and the mean sum of squares.

5. The optical transmitter as claimed in claim 1, wherein the processor calculates a first variance of the first control error and a second variance of the second control error, and determines the control value using either one of the first control error or the second control error having a smaller variance.

6. The optical transmitter as claimed in claim 1, wherein the processor has a selector that selects either one of the first control error or the second control error based on a comparison result between the first variance and the second variance.

7. An optical transmitter comprising:
an electro-optic modulator;
a monitor circuit that monitors output light of the electro-optic modulator; and
a processor that controls a bias voltage of the electro-optic modulator using a monitoring result of the monitor circuit,
wherein the processor superimposes a first dither signal with a first frequency and a second dither signal with a second frequency different from the first frequency, onto one bias voltage in a time sharing manner, calculates a first control error based on a first component oscillating at the first frequency and a second control error based on a second component oscillating at the second frequency based on the monitoring result, and determines a control value for controlling the bias voltage using the first control error and the second control error, and
wherein the monitor circuit has a photodetector that detects a portion of the output light of the electro-optic modulator, a first filter that extracts the first component oscillating at the first frequency from an output of the photodetector, and a second filter that extracts the second component oscillating at the second frequency from the output of the photodetector, and
wherein the processor synchronizes switching between the first dither signal and the second dither signal with switching between the first filter and the second filter.

8. A communication apparatus comprising:
an optical transceiver; and
an electrical or electronic device provided to operate the optical transceiver,
wherein the optical transceiver includes an electro-optic modulator, a monitor circuit that monitors output light of the electro-optic modulator, and a processor that controls a bias voltage of the electro-optic modulator using a monitoring result of the monitor circuit, wherein the processor superimposes a first dither signal of a first frequency and a second dither signal of a second frequency, which is different from the first frequency, onto the bias voltage in a time sharing manner, calculates a first control error based on a first component oscillating at the first frequency and a second control error based on a second component oscillating at the second frequency from the monitoring result, and determines a control value for controlling the bias voltage using the first control error and the second control error, wherein the monitor circuit has a photodetector that detects a portion of the output light of the electro-optic modulator, a first filter that extracts the first component oscillating at the first frequency from an output of the photodetector, and a second filter that extracts the second component oscillating at the second frequency from the output of the photodetector, and wherein the processor synchronizes switching between the first dither signal and the second dither signal with switching between the first filter and the second filter.

9. A method of controlling a bias voltage of an electro-optic modulator, comprising:

superimposing a first dither signal with a first frequency and a second dither signal with a second frequency different from the first frequency onto the bias voltage of the electro-optic modulator in a time sharing manner;

monitoring an output light of the electro-optic modulator;

calculating a first control error based on a first component oscillating at the first frequency, and a second control error based on a second component oscillating at the second frequency from a monitoring result; and determining a control value for controlling the bias voltage using the first control error and the second control error, wherein the monitoring of the output light of the electro-optic modulator includes extracting the first component from the output light of the electro-optic modulator by a first filter, and extracting the second component from the output light of the electro-optic modulator by a second filter, and switching between the first dither signal and the second dither signal is synchronized with switching between the first filter and the second filter.

10. A communication apparatus comprising:

an optical transceiver; and an electrical or electronic device provided to operate the optical transceiver, wherein the optical transceiver includes an electro-optic modulator, a monitor circuit that monitors output light of the electro-optic modulator, and a processor that controls a bias voltage of the electro-optic modulator using a monitoring result of the monitor circuit, and wherein the processor superimposes a first dither signal of a first frequency and a second dither signal of a second frequency, which is different from the first frequency, onto the bias voltage in a time sharing manner, calculates a first control error based on a first component oscillating at the first frequency and a second control error based on a second component oscillating at the second frequency from the monitoring result, and determines a control value for controlling the bias voltage using the first control error and the second control error, wherein the electro-optic modulator is a Mach-Zehnder modulator in which a first child modulator and a second child modulator are nested to form a parent modulator, and wherein the processor superimposes the first dither signal onto each of a first bias for the first child modulator, a second bias for the second child modulator, and a third bias for the parent modulator in a first section of a bias control cycle to detect the first component from the output light of the electro-optic modulator, and superimposes the second dither signal onto each of the first bias, the second bias, and the third bias in a second section of the bias control cycle to detect the second component from the output light of the electro-optic modulator.

11. A method of controlling a bias voltage of an electro-optic modulator, the electro-optic modulator being a Mach-Zehnder modulator in which a first child modulator and a second child modulator are nested to form a parent modulator, comprising:

superimposing a first dither signal with a first frequency and a second dither signal with a second frequency different from the first frequency onto the bias voltage of the electro-optic modulator in a time sharing manner;

monitoring an output light of the electro-optic modulator;

calculating a first control error based on a first component oscillating at the first frequency, and a second control error based on a second component oscillating at the second frequency from a monitoring result; and determining a control value for controlling the bias voltage using the first control error and the second control error, wherein the first dither signal is superimposed onto each of a first bias for the first child modulator, a second bias for the second child modulator, and a third bias for the parent modulator in a first section of a bias control cycle to detect the first component from the output light of the electro-optic modulator, and the second dither signal is superimposed onto each of the first bias, the second bias, and the third bias in a second section of the bias control cycle to detect the second component from the output light of the electro-optic modulator.

12. The method as claimed in claim 11, comprising:

performing an arithmetic calculation using the first control error and the second control error; and determining the control value based on a result of the arithmetic calculation.

13. The method as claimed in claim 12, wherein the arithmetic operation includes calculation of a simple average or a mean sum of squares of the first control error and the second control error, and the simple average or the mean sum of squares is used to determine the control value.

14. The method as claimed in claim 12, wherein the arithmetic operation includes calculation of a first variance of the first control error and a second variance of the second control error, and either one of the first control error or the second control error having a smaller variance is used to determine the control value.

* * * * *